Feb. 15, 1927. 1,617,960
G. MÜLLER
PROCESS OF RECOVERING ADSORBED MATERIAL FROM ADSORPTIVE MATERIAL
Filed Feb. 6, 1925
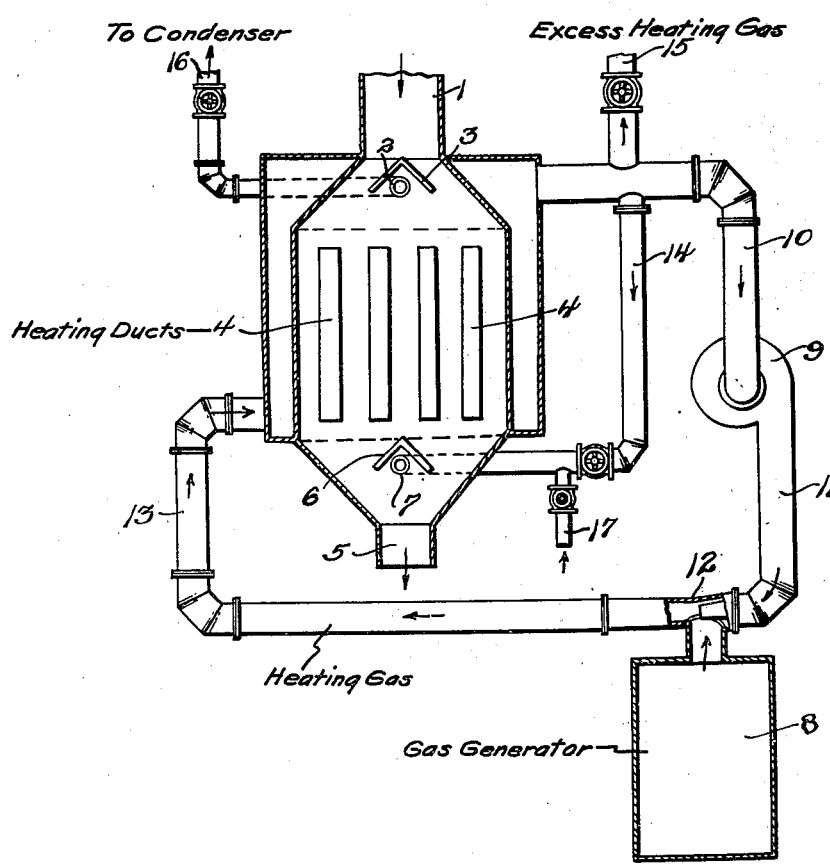

Patented Feb. 15, 1927.

1,617,960

UNITED STATES PATENT OFFICE.

GEORG MÜLLER, OF FRANKFORT-ON-THE-MAIN, GERMANY, ASSIGNOR TO AMERICAN LURGI CORPORATION, OF NEW YORK, N. Y., A CORPORATION OF NEW YORK.

PROCESS OF RECOVERING ADSORBED MATERIAL FROM ADSORPTIVE MATERIAL.

Application filed February 6, 1925. Serial No. 7,430.

It is known that substances adsorbed by adsorption materials such as active carbon, silicic acid gel, alumina and the like, may be recovered by externally heating regenerating chambers, whereby the adsorption material is simultaneously reconditioned for use.

With the heating means up to now usually employed for this purpose, however, the temperature of the gases of combustion is so high that a material chemical change of adsorbed substances to be recovered cannot be avoided. Also difficulties are encountered in regard to the apparatus used so that an economical recovery of the adsorbed substances by means of external heating is not easily attainable.

According to the present invention, the disadvantages incident to the usual regeneration by means of external heating are obviated by applying only so much heat as is necessary to expel the adsorbed substances. The new process avoids an excessive mechanical as well as an excessive chemical action upon the material to be regenerated and the regenerating apparatus itself.

The required temperature of the heating gases for the external heating may be obtained in any suitable manner. A very simple source of external heat is provided wherever it is possible to use waste gases having exactly the required temperature. However, whenever the external heat must be provided by special means or must be derived from waste gases having a temperature in excess of that required, it has been found advantageous to circulate the heating gases in such a way that the hot gas is diluted with gas previously used for heating. By means of such a circulating system it is possible to control the temperature as well as the composition of the heating gases without detrimentally affecting the heat effect upon the regeneration. It is particularly possible, in this way, to economically produce an oxygen-free heating gas of low temperature, by conducting the combustion at a high temperature and with a minimum excess of air and by mixing with these heating gases, before they enter the regenerating apparatus, a quantity of gas from the circulating system sufficient to obtain the desired temperature.

The production of gas of low oxygen content has also the advantage that part of the gas already used for externally heating the regenerating apparatus may be used for other purposes for which the use of an inert gas substantially free from oxygen is advantageous. Thus it is possible to pass a small portion of this gas through the material to be regenerated to effect a rinsing action, since the inert gas cannot injuriously affect either the adsorption material or the adsorbed substance, in contradistinction to a gas containing oxygen. It is also possible to pass larger quantities of the gas after having given off a definite amount of heat to the walls of the regenerating apparatus wholly or largely as a carrier of heat through the material to be regenerated to effect a combined external and internal heating. As is understood, these gases may also be heated before they are passed through the adsorption material. For the internal heating, as is evident, may also be used other gases of suitable temperature and composition.

The industries making use of adsorption material often need larger quantities of inert gases to protect highly volatile or highly combustible substances against contact with air or other gases. Also for that purpose may the gas produced in accordance with the invention be used to advantage. The expenses of specially producing the protecting gases are thereby eliminated.

The drawing is a more or less diagrammatic representation of a device according to the invention.

The adsorption material falls from above into the regenerating chamber 1. The roof-like partition 2 distributes the material and at the same time forms a gas space 3. The material passes in relatively thin layers downwardly between the heated walls of the ducts 4 whereby the adsorbed substances are driven off and may then be withdrawn from the gas space 3 through a pipe 16 to a suitable condensing apparatus.

The regenerated material passes through the outlet 5. A roof-like partition 6 above the outlet together with the conical form of the bottom of the chamber 1 effects a substantially uniform rate of movement of the material through the chamber. The partition 6 also defines a gas space 7 into which gas may be conducted through a pipe 14.

The heating system for carrying out the principal object of the invention is preferably as follows:—

The gas is assumed to be generated by a special gas generator 8. The principal feature is a circulating system containing the chamber 1 and a pressure device 9 and preferably a jet device 12. The pressure device 9 circulates gas under a definite pressure through the heating ducts 4 of the chamber 1. The gas generator is connected to the circulating system adjacent the injector 12 so that the heating gas is sucked into it and passed through the chamber 1 together with circulating gas. The excess gas escapes through a valved conduit 15. The gas generator, the pressure device and the valve of the conduit may be accurately adjusted to produce the required heat in the chamber.

It is understood that there is considerable latitude in regard to the mode of replenishing the heat of the circulating system. Instead of maintaining the temperature by means of gas from a generator, the heat may be supplied indirectly by means of superheater, recuperator or other well known means for that purpose.

The excess gas incident to the use of a gas generator may be advantageously disposed of for the purpose of effecting a combined external and internal heating. As indicated in the drawing, a conduit 14 may branch off from the circulating system to pass gas into and through the material to be regenerated. The gas passes through conduit 14 into the gas space 7 and then through the material to the gas space 3. The gas may thus be used for internal heating or also for the purpose of more quickly carrying off the gas driven off from the adsorption material. In case the gas entering through the conduit 14 is to be heated, a superheater, recuperator or any other equivalent device may be applied for that purpose, or heating gas may be passed directly from the gas generator into the conduit through a valve controlled pipe 17, as indicated, so as to control the temperature of the gas passing through the adsorption material.

The excess gas may be utilized for other purposes, as for instance, for protection purposes as heretofore mentioned.

The process is applicable also when the adsorption material is not moved in the regenerating chamber, but is at rest. It is feasible to periodically replace the regeneration chamber by another or to periodically shift the gas intake and out-take to other containers.

What I claim is:

1. Process of recovering adsorbed material from adsorptive material, which comprises circulating heating gases in a path including a zone of heat transfer relationship with the adsorptive material, introducing fresh heating gases into the circulating gases at a point in said path in front of said zone and withdrawing a portion of said circulating gases from said path at a point behind said zone.

2. Process of recovering adsorbed material from adsorptive material as defined in claim 1 in which the fresh heating gases are at a temperature in excess of that required for the expulsion of the adsorbed material from the adsorptive material and in which said fresh heating gases are mixed with the circulating gases in such proportions as to produce a mixture of the desired temperature.

3. Process of recovering adsorbed material from adsorptive material as defined in claim 1 in which the fresh heating gases are products of combustion at a temperature in excess of that required for the expulsion of the adsorbed material from the adsorptive material.

4. Process of recovering adsorbed material from adsorptive material as defined in claim 1 in which at least a part of the circulating gases are contacted directly with the adsorptive material.

5. Process of recovering adsorbed material from adsorptive material as defined in claim 1 in which the circulating gases are used for externally heating the adsorptive material and in which at least a part of the gases withdrawn from the path are passed into direct contact with the adsorptive material.

6. Process of recovering adsorbed material from adsorptive material as defined in claim 1, in which the circulating gases are used for indirectly heating the adsorptive material and in which at least a part of the gases withdrawn from the path are heated and passed through and in direct contact with the adsorptive material.

In testimony whereof I affix my signature.

GEORG MÜLLER.